US010030711B2

(12) United States Patent
Mathie et al.

(10) Patent No.: US 10,030,711 B2
(45) Date of Patent: Jul. 24, 2018

(54) PREVENTING NOISE FROM MATING SPLINE TEETH

(71) Applicant: FORD GLOBAL TECHNOLOGIES, LLC, Dearborn, MI (US)

(72) Inventors: Craig M. Mathie, White Lake Township, MI (US); Shailesh S. Kozarekar, Novi, MI (US); James G. Buvalic, Canton, MI (US); Norman J. Bird, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1262 days.

(21) Appl. No.: 13/735,736

(22) Filed: Jan. 7, 2013

(65) Prior Publication Data
US 2014/0193194 A1 Jul. 10, 2014

(51) Int. Cl.
| F16D 3/77 | (2006.01) |
| F16D 1/02 | (2006.01) |
| F16D 1/10 | (2006.01) |

(52) U.S. Cl.
CPC ............. F16D 1/02 (2013.01); F16D 1/10 (2013.01); F16D 2001/103 (2013.01); F16D 2300/22 (2013.01); Y10T 403/7026 (2015.01); Y10T 403/7035 (2015.01)

(58) Field of Classification Search
CPC ..... F16D 3/12; F16D 3/14; F16D 3/76; F16D 3/77; Y10T 464/50
See application file for complete search history.

(56) References Cited

U.S. PATENT DOCUMENTS

| 2,089,168 | A | * | 8/1937 | Brown ........................ 403/359.5 |
| 4,290,515 | A | * | 9/1981 | Bogema et al. ................ 74/331 |
| 4,514,108 | A | * | 4/1985 | Sagady ....................... 403/359.5 |
| 4,721,011 | A | | 1/1988 | Kubo et al. |
| 4,990,122 | A | * | 2/1991 | Grimm .......................... 464/23 |
| 5,807,180 | A | * | 9/1998 | Knodle et al. ................ 464/139 |
| 6,374,689 | B1 | | 4/2002 | Morrow |
| 6,428,236 | B2 | * | 8/2002 | Aota et al. .................. 403/359.5 |
| 6,659,818 | B2 | * | 12/2003 | Booe .............................. 440/83 |
| 6,666,103 | B2 | | 12/2003 | Gotoh |
| 2002/0044706 | A1 | | 4/2002 | Kayama et al. |
| 2006/0086559 | A1 | * | 4/2006 | Segawa et al. ............... 180/444 |
| 2006/0213244 | A1 | | 9/2006 | Brissette |
| 2009/0203453 | A1 | * | 8/2009 | Heinrich et al. ............... 464/75 |
| 2009/0215543 | A1 | | 8/2009 | Brissette |
| 2011/0092333 | A1 | | 4/2011 | Murata et al. |

FOREIGN PATENT DOCUMENTS

DE 102008014445 A1 * 5/2009 ............... F16D 3/66

\* cited by examiner

*Primary Examiner* — Michael P Ferguson
(74) *Attorney, Agent, or Firm* — David B. Kelley; MacMillan, Sobanski & Todd, LLC

(57) ABSTRACT

A mechanical connection includes first and second components supported for rotation, the first component formed with first spline teeth, the second component formed with second spline teeth meshing with the first spline teeth, and a damper fitted in a groove formed in one of the first and second components, including an extension secured to the damper, contacting and extending between at least some of the first and second spline teeth.

6 Claims, 5 Drawing Sheets

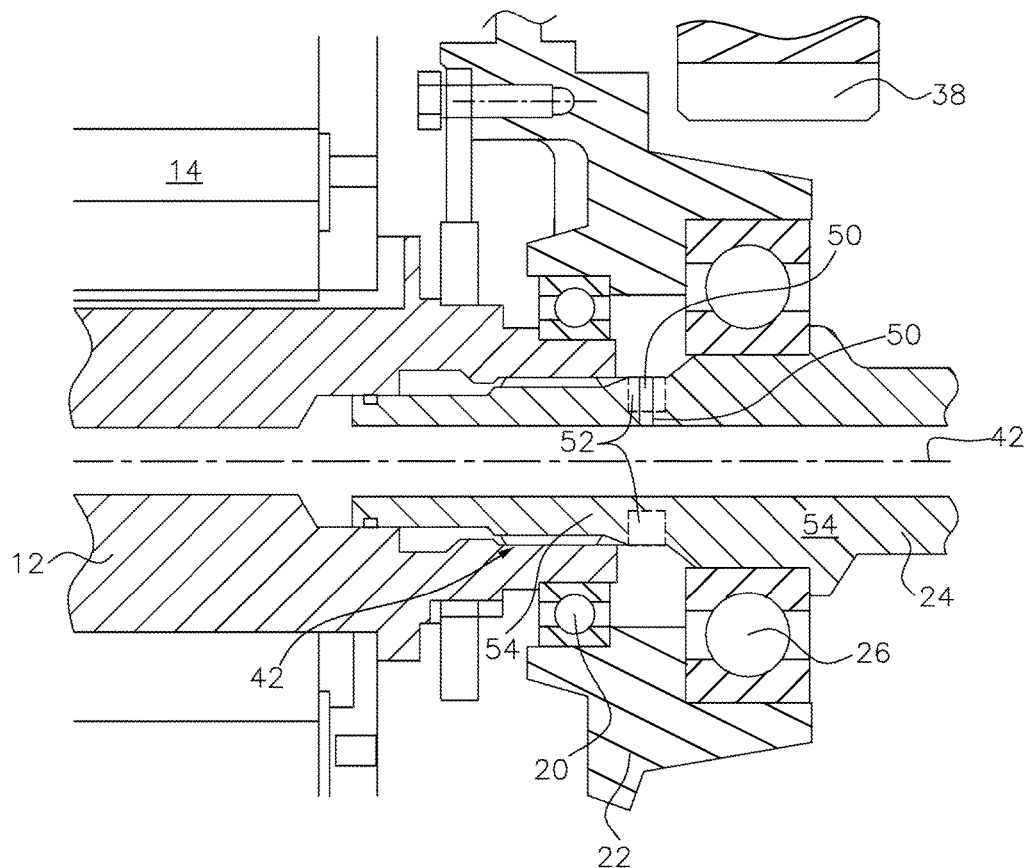
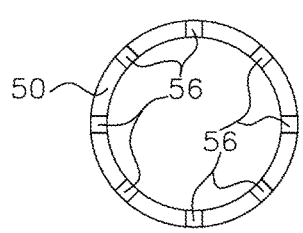
Fig. 3B
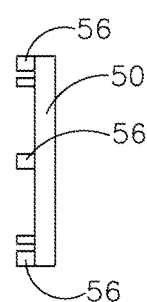
Fig. 3C
Fig. 3A

PREVENTING NOISE FROM MATING SPLINE TEETH

BACKGROUND OF THE INVENTION

1. Field of the Invention

This invention relates generally to a connection between two rotating components made by mating spline teeth formed on the components.

2. Description of the Prior Art

When a spline connection between rotating components transmits torque, an objectionable noise may be produced in a motor vehicle powertrain. A spline interface connects an electric traction motor's rotor shaft and a countershaft inside a transmission. In such transmissions, the motor's rotor is constrained axially and radially by a pair of bearings, and the countershaft is likewise constrained axially and radially by a pair of bearings.

Since the two shafts are concentric, they also share a spline interface that transfers torque between them and acts as another radial constraint, thereby producing an over-constrained assembly wherein slight misalignments can subject the spline interface to varying loading conditions during rotation. Loading and subsequent relative movement between the splines can cause a ticking noise.

SUMMARY OF THE INVENTION

A mechanical connection includes first and second components supported for rotation, the first component formed with first spline teeth, the second component formed with second spline teeth meshing with the first spline teeth, and a damper fitted in a groove formed in one of the first and second components, including an extension secured to the damper, contacting and extending between at least some of the first and second spline teeth.

The connection relieves over-constraint in the transmission assembly at the spline interface between the shafts.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIGS. 3A, 3B and 3C illustrate an O-ring that is fitted into a recess in the countershaft near a spline interface;

DESCRIPTION OF THE PREFERRED EMBODIMENT

Figure 1A:
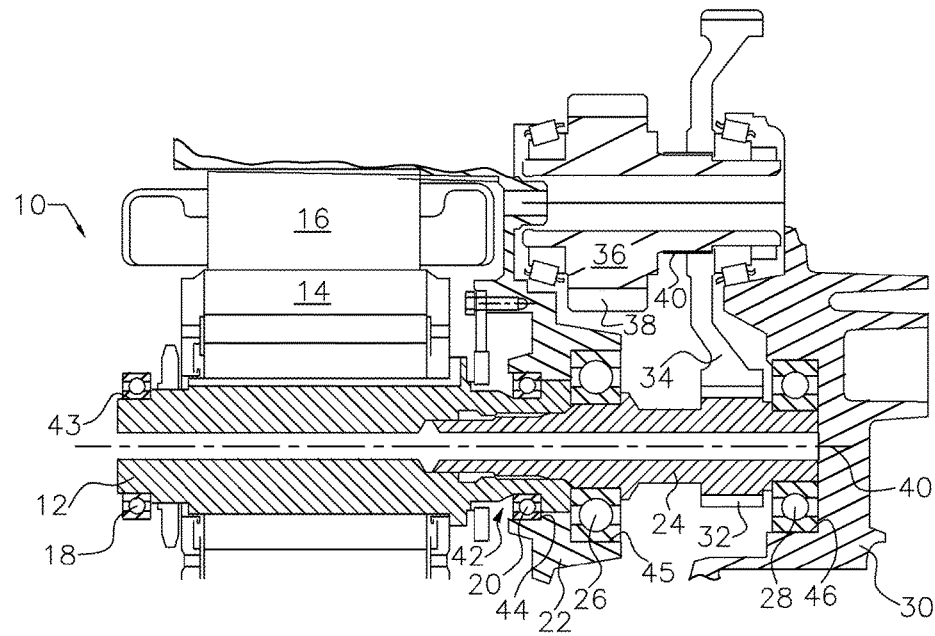
FIG. 1A is a cross sectional side view showing a rotor shaft and countershaft of a hybrid electric powertrain.

Referring now to FIG. 1, a traction motor 10 of a hybrid electric powertrain includes a rotor shaft 12, which supports the rotor 14 of the motor 10, whose stator 16 surrounds the rotor. Rotor shaft 12 is supported by roller bearings 18, 20 on a bulkhead 22 in the transmission housing.

A countershaft 24 is supported by roller bearings 26, 28 on the bulkhead 22 and a transmission housing 30, respectively. Countershaft 24 is formed with a pinion 32, which meshes continually with a gear 34. Shaft 36, which is formed with a pinion 38, is connected by a spline to gear 34.

The motor's rotor 14 is constrained axially and radially by bearings 18, 20. The countershaft 24 is likewise constrained axially and radially by bearings 26, 28.

Because rotor shaft 12 and countershaft 24 are substantially concentric with axis 40, they also share a spline connection 42, which transmits torque between them and provides radial constraint.

Figure 1B:
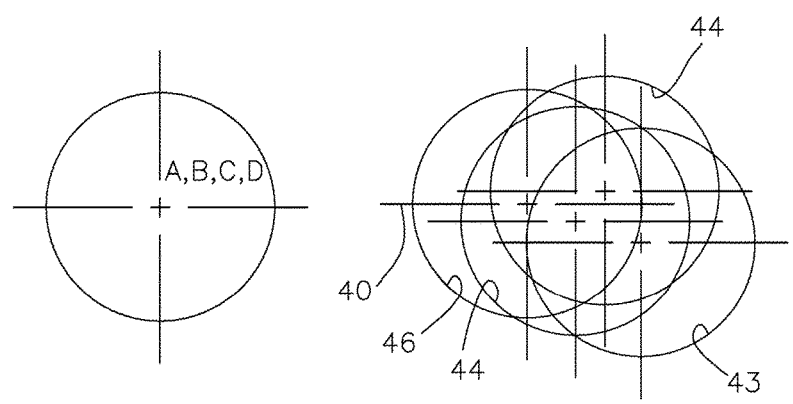
FIG. 1B is an end view of the shafts that are secured mutually at the spline connection showing the unaligned centers of the bearing pockets.

In this arrangement, bearing 18 is fitted into a bearing pocket 43 formed in rotor shaft 12, bearing 20 is fitted into a bearing pocket 44 formed in bulkhead 22, bearing 26 is fitted into a bearing pocket 45 formed in bulkhead 22, and bearing 28 is fitted into a bearing pocket 46 formed in transmission housing 30. The center of each bearing pocket 43-46 is spaced radially from the center of each of the other bearing pockets. As FIG. 1B shows, the center of bearing pocket 46 for bearing 28 is located on axis 40. But the center of bearing pocket 45 for bearing 26 is located at a lower elevation that that of axis 40, and the center of the bearing pocket 44 for bearing 20 is located at a higher elevation than that of axis 40. The center of the bearing pocket 43 for bearing 18 is located at a lower elevation than that of the center of bearing pocket 45.

Because the centers of the bearing pockets 43-46 are unaligned and offset radially, a radial preload is produced at the spline connection 42, the preload eliminating relative movement between the teeth of the splines and reducing or eliminating noise emanating from the spline connection 42.

An alternate technique for producing a preloaded spline connection 42 is to replace one or more of the roller bearings 18, 20, 26, 28 with a tapered bearing. The tapered bearing produces a preload to the spline connection 42, thereby minimizing or eliminating relative movement among the internal and external spline teeth at spline connection 42.

Figure 2A:
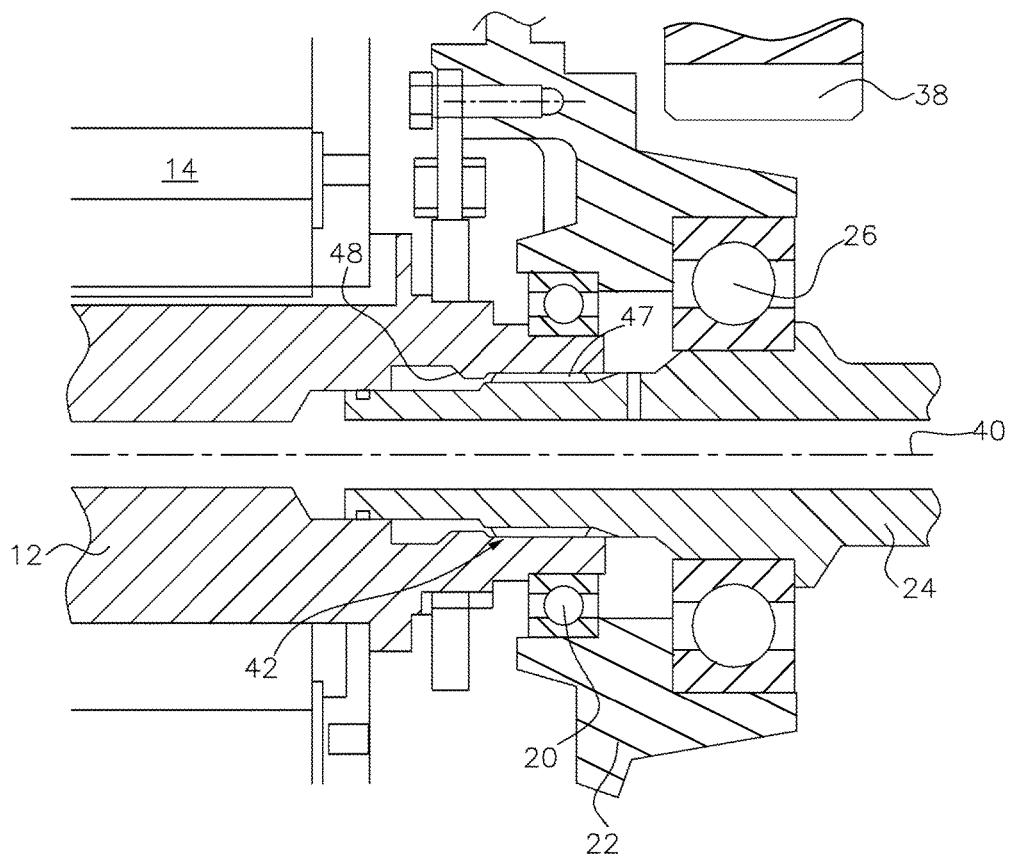
FIG. 2A is a cross sectional side view showing the rotor shaft and countershaft of FIG. 1.
Figure 2B:
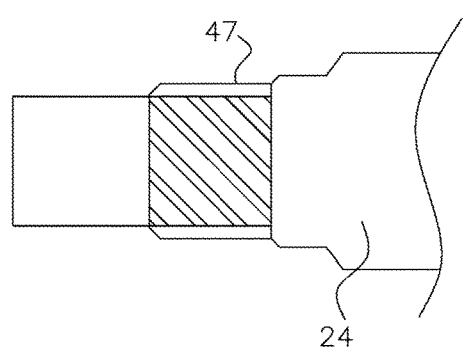
FIG. 2B is a side view showing external helical spline teeth formed on the countershaft.

As FIGS. 2A and 2B illustrate, the countershaft 24 is formed with external helical spline teeth 47, and the rotor shaft 12 is formed with internal helical spline teeth 48, which mesh with spline teeth 47 at the spline connection. Either one of shafts 12, 24 can be formed with external spline teeth and the other shaft can be formed with internal spline teeth. The helix angle reduces the abrupt transmission of torque between mating spline teeth adjacent teeth.

As FIGS. 3A, 3B and 3C illustrate, a damper 50 in the form of an O-ring made of relatively soft material is fitted into a recess 52 formed in the wall 54 of countershaft 24 near the spline connection 42. Preferably damper 50 includes short, axial fingers 56, which extend into the spline connection 42 and into contact with the internal and external spline teeth. These axial fingers 56 eliminate clearances between the spline teeth and provide damping to the spline connection 42.

Figure 4A:
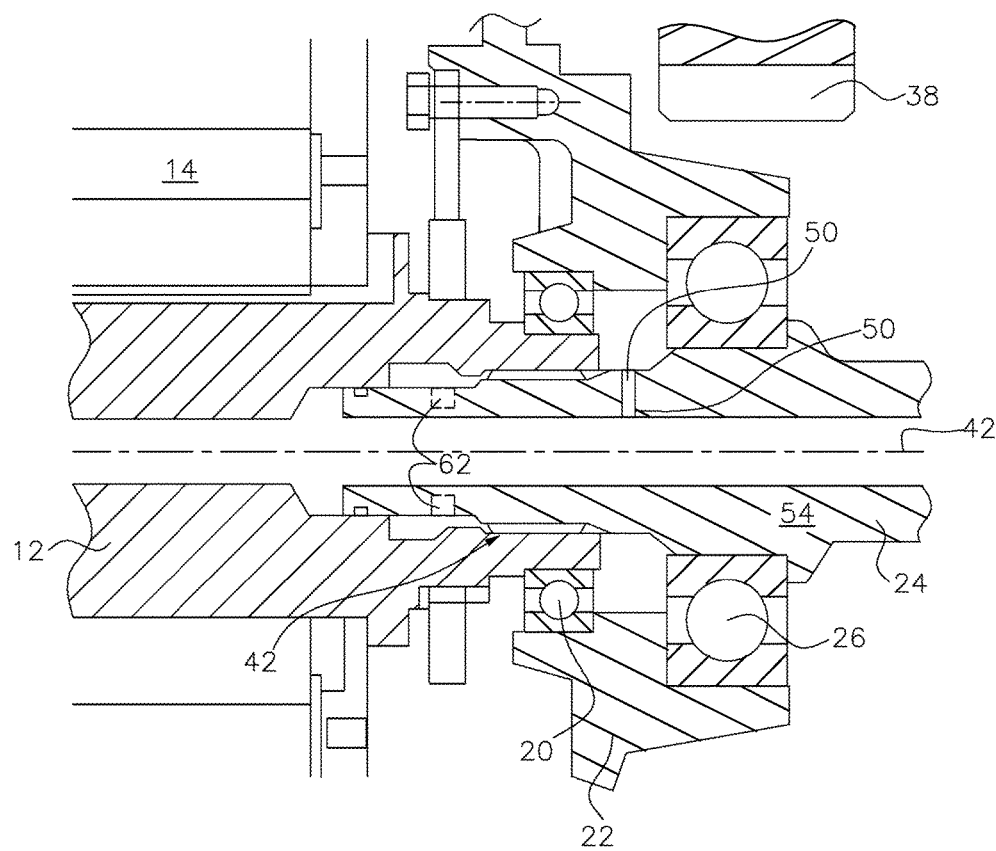
FIGS. 4A, 4B and 4C illustrate an O-ring fitted into a recess in the countershaft.
Figures 4B, 4C:
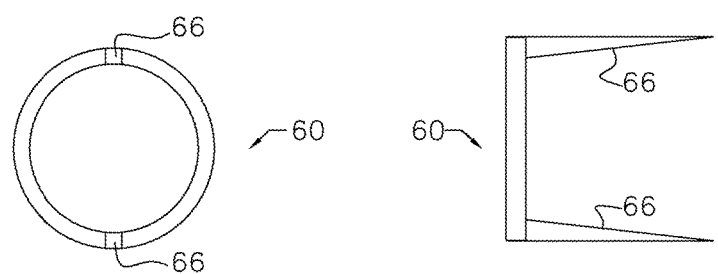

FIGS. 4A, 4B and 4C show a damper 60 in the form of an O-ring made of relatively soft material fitted into an annular recess or groove 62 formed in the wall 54 of countershaft 24 near the spline connection 42. Preferably damper O-ring 60 includes long, axial fingers 66, which extend axially into the spline connection 42, into a radial space that otherwise would be occupied by spline teeth of the connection 42, and into contact with the internal and external spline teeth of the spline connection 42. These fingers 66 eliminate clearances between the spline teeth and provide damping to the spline connection 42.

Figure 5A:
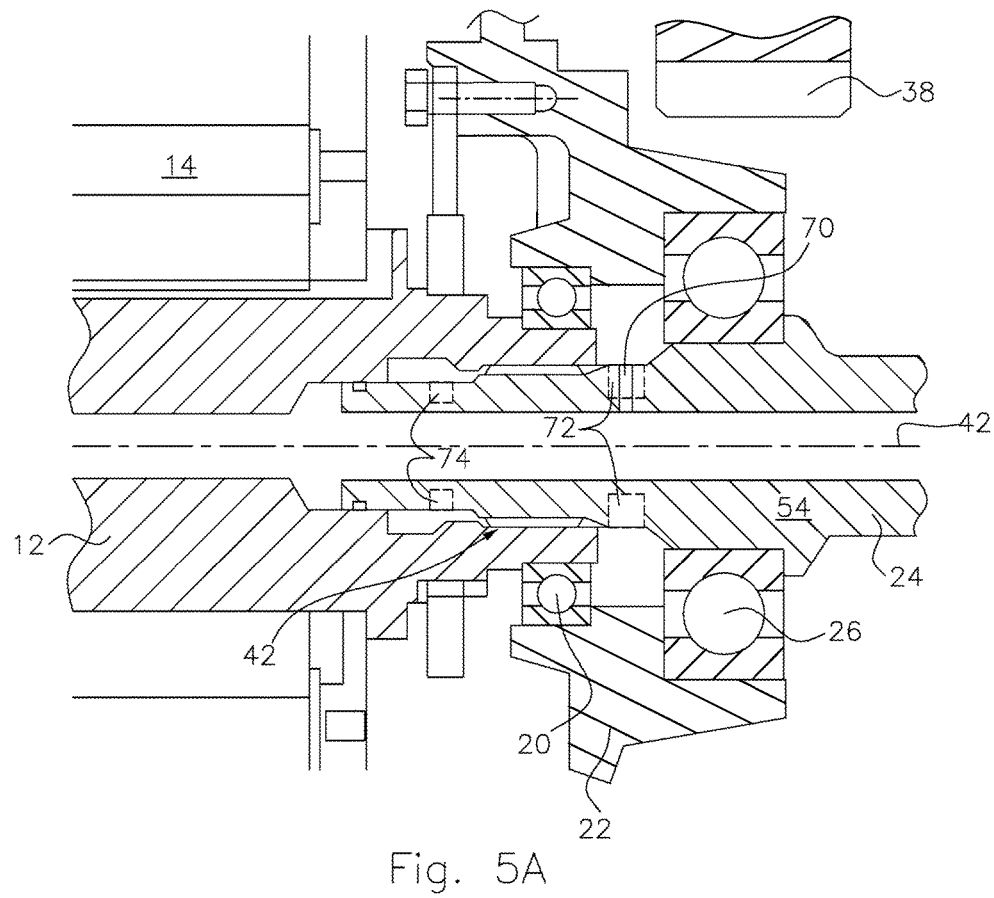
FIGS. 5A and 5B illustrate a ring component fitted into recesses in the countershaft.
Figure 5B:
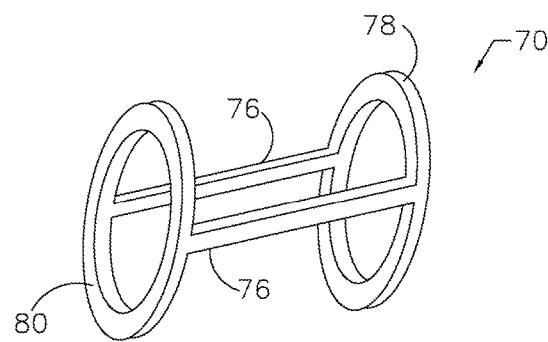

FIGS. 5A and 5B show a damper 70 in the form of an O-ring made of relatively soft material fitted into a first annular recess 72 formed in the wall 54 of countershaft 24 and a second annular recess 74 formed in the wall 54 of countershaft 24, the recesses 72, 74 being located on opposite axial sides of and near the spline connection 42. Preferably damper 70 includes axial legs 76, which extend axially into the spline connection 42, into a radial space that otherwise would be occupied by spline teeth of the spline connection 42, and into contact with the internal and external spline teeth of the connection spline. These axial legs 76 connect two rings 78, 80, each leg being fitted into one of the recesses 72, 74. The axial legs 76 eliminate clearances between the internal and external spline teeth of the spline connection 42 and provide damping to the spline connection 42.

In accordance with the provisions of the patent statutes, the preferred embodiment has been described. However, it should be noted that the alternate embodiments can be practiced otherwise than as specifically illustrated and described.

The invention claimed is:

1. A mechanical connection, comprising:
   first and second components supported for rotation, the first component formed with first spline teeth, the second component formed with second spline teeth meshing with the first spline teeth;
   a damper fitted in a groove formed in one of the first and second components, including an extension secured to the damper, contacting and extending between at least some of the first and second spline teeth.

2. The mechanical connection of claim 1, wherein the first and second spline teeth are helical teeth.

3. The mechanical connection of claim 1, wherein:
   the groove is an annular groove located adjacent the spline teeth; and
   the damper further comprises a ring fitted in the annular groove, including multiple protrusions that extend axially into the meshing first and second spline teeth.

4. The mechanical connection of claim 1, wherein:
   the groove includes first and second annular grooves, each groove located at an opposite axial side of the spline teeth; and
   the damper further comprises first and second rings, and annularly spaced axial legs connecting the rings, the first ring fitted in the first annular groove, the second ring fitted in the second annular groove, the axial legs extending axially into the meshing first and second spline teeth.

5. The mechanical connection of claim 1, wherein:
   the first component comprises a first shaft supported on a first bearing located in a first bearing recess and on a second bearing located in a second bearing recess;
   the second component comprises a second shaft supported on a third bearing located in a third bearing recess and on a fourth bearing located in a fourth bearing recess, the bearing recesses being nonaligned mutually.

6. The mechanical connection of claim 1, wherein:
   the first component comprises a first shaft supported on a first bearing located in a first bearing recess and on a second bearing located in a second bearing recess, the first and second bearing recesses constraining movement of the first shaft against axial and radial displacement;
   the second component comprises a second shaft supported on a third bearing located in a third bearing recess and on a fourth bearing located in a fourth bearing recess, the third and fourth bearing recesses constraining movement of the second shaft against axial and radial displacement, the bearing recesses being nonaligned mutually.

* * * * *